United States Patent
Hamed et al.

(10) Patent No.: US 6,476,131 B1
(45) Date of Patent: Nov. 5, 2002

(54) SELF-REINFORCED RUBBER MATRIX HAVING HIGH GLASS TRANSITION TEMPERATURE THERMOSET DOMAINS

(75) Inventors: Gary Hamed, Stow; Roderic Quirk, Akron; Frank Kelley, Hudson, all of OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 09/856,227

(22) PCT Filed: Sep. 15, 2000

(86) PCT No.: PCT/US00/25311
§ 371 (c)(1),
(2), (4) Date: May 16, 2001

(87) PCT Pub. No.: WO01/19917
PCT Pub. Date: Mar. 22, 2001

Related U.S. Application Data

(60) Provisional application No. 60/154,561, filed on Sep. 17, 1999.

(51) Int. Cl.⁷ ............................................. C08L 53/00
(52) U.S. Cl. ........................... 525/91; 525/88; 525/89; 525/92 R; 525/95; 525/98
(58) Field of Search .......................... 525/91, 88, 89, 525/92 R, 95, 98

(56) References Cited

U.S. PATENT DOCUMENTS

| | | | |
|---|---|---|---|
| 4,237,245 A | 12/1980 | Halasa et al. | 525/272 |
| 4,252,914 A * | 2/1981 | Halasa et al. | 525/98 |
| 4,559,117 A | 12/1985 | Bohm | 204/159 |
| 4,772,667 A | 9/1988 | Biletch et al. | 525/243 |
| 4,853,434 A | 8/1989 | Block | 525/100 |
| 5,292,806 A * | 3/1994 | Diehl et al. | 525/98 |
| 5,302,649 A | 4/1994 | Sasaki et al. | 524/274 |
| 5,356,993 A | 10/1994 | Erickson et al. | 525/89 |
| 5,376,503 A | 12/1994 | Audett et al. | 530/270 |
| 5,393,787 A | 2/1995 | Nestegard et al. | 524/575 |
| 5,412,031 A | 5/1995 | Ma et al. | 525/98 |
| 5,428,068 A | 6/1995 | McBain et al. | 523/522 |
| 5,461,112 A | 10/1995 | Masse et al. | 525/92 |
| 5,478,885 A | 12/1995 | Maase et al. | 525/92 |
| 5,491,184 A | 2/1996 | McBain et al. | 523/436 |
| 5,510,548 A | 4/1996 | Coolbaugh et al. | 585/12 |
| 5,545,783 A | 8/1996 | Coolbaugh et al. | 585/12 |
| 5,552,492 A | 9/1996 | Brandes et al. | 525/314 |
| 5,576,396 A | 11/1996 | Spence et al. | 525/314 |
| 5,656,205 A | 8/1997 | Rabolt et al. | 252/582 |
| 5,719,226 A | 2/1998 | Kegley | 524/505 |
| 5,721,316 A | 2/1998 | Maase et al. | 525/92 |
| 5,773,506 A | 6/1998 | Nestegard et al. | 524/505 |

OTHER PUBLICATIONS

English abstract of Chinese Patent No. 1197815.
English abstract of Japanese Patent No. 63193941.
English abstract of Japanese Patent No. 1313547.

* cited by examiner

*Primary Examiner*—James J. Seidleck
*Assistant Examiner*—Olga Asinovsky
(74) *Attorney, Agent, or Firm*—Renner, Kenner, Greive, Bobak, Taylor & Weber

(57) ABSTRACT

A self-reinforced polymeric composition of matter comprising a plurality of hard domains dispersed throughout an elastomeric matrix, wherein the plurality of hard domains are formed by thermodynamic phase separation and crosslinking of at least one thermosettable domain block of a polymeric precursor and are substantially bonded to the elastomeric matrix.

21 Claims, No Drawings

SELF-REINFORCED RUBBER MATRIX HAVING HIGH GLASS TRANSITION TEMPERATURE THERMOSET DOMAINS

This application claims benefit of 60/154,561 filed Sep. 17, 1999.

TECHNICAL FIELD

This invention relates to self-reinforced rubbery compositions. These rubbery compositions comprise a rubbery matrix having glassy thermoset domains dispersed therein with covalent bonding between the rubbery matrix and the thermoset domains. The invention also relates to a method for making these compositions.

BACKGROUND OF THE INVENTION

It is desirable for rubbers used in severe dynamic applications, such as tires, to possess minimal hysteresis loss to provide low rolling resistance and low running temperature. Rubbers however, must be somewhat hysteretic in order to exhibit resistance to crack growth, crack propagation, and abrasion. Generally, when an elastomer is deformed, part of the input energy is stored elastically in the chains and is available as a driving force for fracture (i.e., will be released upon crack growth), while the remainder of the energy is dissipated through molecular motions into heat.

At high crosslink levels, when hysteresis loss is typically low, chain motions become quite restricted and the "tight" network cannot dissipate much energy. As a result, these networks, may suffer from brittle fracture at low elongation. Rubbers exhibiting high hysteresis loss, which typically have low crosslink levels, can have high tear strength at room temperature. These rubbers, however, are unsuited for dynamic applications because the substantial heat generation and concomitant temperature rise that occurs during these applications weakens the rubbers. Therefore, the art has generally sought to provide rubbers for dynamic applications that exhibit low hysteresis at small strains and become highly hysteretic at high strains.

One approach has been to disperse particulate filler within the rubber. This creates a rubber having hard domains of particulate filler dispersed within a soft rubber matrix. The addition of particulate fillers tends to reduce abrasion and crack growth rates by increasing high strain modulus and energy dissipation at high strains. The incorporation of particulate filler, however, also increases hysteresis loss at small strains. This results in an unwanted increase in power consumption and heat generation. Therefore, there is a desire in the art to provide reinforcement within a rubber matrix while maintaining low hysteresis loss at small strain.

Limited bonding between rubber and carbon black may be one source of undesirable, low strain hysteresis loss. Much effort has been made to try to lower hysteresis and enhance reinforcement by increasing the interaction of carbon black with rubber. Approaches have included heat treatment of carbon black/rubber mixes, functionalization of carbon black and the diene rubber, and the addition of a carbon black/rubber coupling agent.

More success has been achieved in enhancing filler/rubber interaction in the case of silica-filled rubber. By using a silane coupling agent, e.g., bis-(3-triethoxysilylpropyl)-tetrasulfane, with an extended high temperature mixing cycle, tire tread compounds reinforced with silica can exhibit reduced rolling resistance, while maintaining good wet skid and abrasion resistance.

The approach herein to creating a morphology of hard domains dispersed in a rubbery matrix includes thermodynamic phase separation. The concept of thermodynamic phase separation has been used to prepare many elastomers where the end blocks are thermoplastic. SBS (polystyrene-b-polybutadiene-b-polystyrene), SIS (polystyrene-b-polyisoprene-b-polystyrene), SEBS (styrene-b-ethylene butylene diene-b-styrene), SNBS (styrene-b-nitrile-b-styrene), SAS (styrene-b-acrylic-b-styrene), SCS (styrene-b-chloroprene-b-styrene), and SEPS (styrene-b-ethylene propylene diene-b-styrene) tri-block copolymers are examples. The phase separated polystyrene domains are a few hundred angstroms in size. These elastomers have high hardness, high strength, and high extensibility.

These elastomers, however, are unsuitable for high dynamic loading applications, such as tires, because the end block polystyrene is, by design, a thermoplastic elastomer that creeps and weakens quickly as temperature is increased. It has been found that these problems can be remedied by transforming the end blocks into hard glassy thermosets during the final molding of the elastomers. This structure mimics, in many ways, particulate filled rubber in that both contain non-hysteretic, temperature insensitive, hard domains dispersed within an elastomer matrix. These mesophase separated tri-block elastomers, however, all include rubber chains that are linked to hard domains while in particulate filled compositions the rubber chains either do not interact or interact weakly with the filler.

While attempts have been made to control domain sizes and the degree of bonding between hard domains dispersed within a rubber matrix, the art has not provided a facile means or device by which this can be accomplished. This is especially true where the monomers, pre-polymers, or copolymers are non-polar such as the precursors for hydrocarbon rubbers.

SUMMARY OF INVENTION

It has now been found that the benefits realized by incorporating reinforcing fillers within polymeric compositions can be achieved by a polymeric composition of matter that includes an elastomeric matrix having dispersed therein reinforcing domains that are chemically bound to the elastomeric matrix. These polymeric compositions may be referred to as self-reinforced elastomeric compositions.

In general the present invention provides a self-reinforced polymeric composition of matter comprising a plurality of hard domains dispersed throughout an elastomeric matrix, wherein the plurality of hard domains are formed by thermodynamic phase separation and selective crosslinking of at least one thermosettable domain block of a polymeric precursor and are substantially bonded to the elastomeric matrix.

The present invention also includes a method for producing a self-reinforced polymeric composition having glassy thermoset domains disbursed in an elastomeric matrix comprising the steps of selecting a thermodynamically separable polymeric precursor having at least one thermosettable domain block and at least one matrix block, and selectively crosslinking the at least one thermosettable domain block of the polymeric precursor with substantially no crosslinking of the at least one matrix block.

DETAILED DESCRIPTION OF THE INVENTION

The self-reinforced rubbery compositions have glassy thermoset domains dispersed within a rubbery matrix. The thermoset domains are chemically bound to the rubbery matrix, which may be slightly crosslinked. More particularly, the rubber compositions are di-block, tri-block, or star-block copolymers that contain at least one thermoset block. The other blocks remain uncrosslinked or are lightly crosslinked. Thus, the at least one crosslinked block provides the thermoset domains and the other uncrosslinked or lightly crosslinked blocks provide the rubbery matrix. Optionally, other additives may be present in the rubbery compositions including those additives typically employed in rubber compositions, as well as those that may provide desirable characteristics to the self-reinforced rubbery compositions.

The glassy thermoset domains are irreversibly crosslinked and preferably have a high crosslink density sufficient to provide thermoset domains having high glass transition temperature. Preferably, the glass transition temperature of these thermoset domains should be greater than about 100° C. and even more preferably greater than about 150° C.

The glassy thermoset domains are mesophase separated from the rubbery matrix in which they are dispersed. Mesophase refers to phases that are less than about 100 nanometers in size and preferably about 10 to 90 nanometers in size.

The rubbery matrix can include any rubbery polymer. Non-limiting examples of rubber polymers include those deriving from conjugated diene monomers and copolymers of conjugated diene monomers and vinyl aromatic monomers.

The rubbery polymers preferably have a glass transition temperature below about −25° C. and more preferably below about −50° C. The number average molecular weight of these rubbery polymers, as determined by GPC with a polystyrene standard, is preferably from about 100,000 to about 700,000, as measured between bonds to the glassy thermoset domain, although the present invention should not be limited thereto or thereby.

The rubbery matrix may be partially crosslinked. The degree of crosslinking, however, should not be so great as to impart a brittle characteristic to the rubbery matrix.

The rubbery polymers of the rubbery matrix are chemically bonded, preferably covalently bonded, to the glassy thermoset domains. This may include a bond at one end of a particular polymer or at both ends of a rubbery polymer.

The self-reinforced rubbery compositions are preferably prepared by selectively crosslinking certain blocks of a polymeric precursor. A polymeric precursor is as a block copolymer or star-block polymer that has at least two thermodynamically-incompatible blocks. Thermodynamically-incompatible blocks are rubbery blocks that will mesophase separate. Thermodynamically incompatible refers to those blocks of the polymeric precursor that will thermodynamically separate such that at least one block will separate from the others to form mesophase domains embedded in a matrix provided by the other blocks of the polymer. Thermodynamically separate refers to a process whereby blocks having distinct thermodynamic characteristics will separate into distinct phases upon the introduction of energy.

The polymeric precursor can include multi-block polymers, such as a di-block, tri-block or star-block polymers, that will thermodynamically separate into mesophases. In the case of tri-block polymers, the blocks can be referred to as end blocks and center-blocks. In the case of a star-block polymers, the phases may be referred to as the core and the arms.

Useful polymeric precursors include at least one domain that is capable of being selectively crosslinked to form a thermoset domain. These thermosettable domain blocks should be capable of being made thermoset by reaction with a crosslinking agent without the occurrence of substantial crosslinking of the matrix blocks of the polymeric precursor. The thermosettable domain block of the polymer precursor is that block that will be selectively crosslinked by the crosslinking agent to form the glassy thermoset domains. It should be understood, however, that the matrix block is likewise thermosettable, but will not be referred to as the thermosettable domain block because it is not the block being targeted for selective crosslinking to form the thermoset domain.

Examples of polymeric precursors include, but are not limited to, tri-block copolymers of 1,2-polybutadiene-b-1,4-polybutadiene-b-1,2-polybutadiene, 1,4-polyisoprene-b-1,2-polybutadiene-b-1,4 polyisoprene, ethylidene norbornene-b-polydiene-b-ethylidene norbornene, styrene-b-polydiene-b-ethylidene norbornene, 1,2-polybutadiene-$S_x$-b-1,4-polybutadiene-$S_x$-b-1,2-polybutadiene wherein x is an integer from about 1 to 10 and S is a polysulfide linkage, styrene-b-butadiene-b-styrene, styrene-b-isoprene-b-styrene, styrene-b-ethylene butylene diene-b-styrene, styrene-b-nitrile-b-styrene, styrene-b-acrylic-b-styrene, styrene-b-chloroprene-b-styrene, styrene-b-ethylene propylene diene-b-styrene; di-block copolymers of 1,2-polybutadiene-b-1,4-polybutadiene, polybutadiene-b-polystyrene, 1,4-polyisoprene-b-1,2-polybutadiene, ethylidene norbornene-b-polydiene, 1,2-polybutadiene-$S_x$-b-1,4-polybutadiene wherein x is an integer from about 1 to 10 and S is a polysulfide linkage, styrene-b-butadiene, styrene-b-isoprene, styrene-b-ethylene butylene diene, styrene-b-nitrile, styrene-b-acrylic, styrene-b-chloroprene, and styrene-b-ethylene propylene diene; and or star-block copolymers. As is generally known in the art, any of the above-mentioned di-block or tri-block copolymers can be provided as star-block copolymers wherein the core of the star-block copolymer corresponds to one block present in the di-block or tri-block copolymer and the arms of the star-block copolymer correspond to the other block or blocks of the di-block or tri-block copolymer. It should, however, be appreciated that those of ordinary skill in the art will be able to select useful polymeric precursors based upon the characterization of useful polymeric precursors given hereinabove and in light of further disclosures provided hereinbelow.

In one embodiment a block of the polymeric precursor is a polydiene and the other block, or blocks in the case of a tri-block or star-block, is ethylidene norbornene (ENB). The ENB not only introduces unsaturation into the block that will thermoset (the thermosettable domain block) but it also increases the $T_g$ of the resulting hard, glassy thermoset domain. It is also preferred to use in a tri-block a polydiene center-block and end blocks which are styrene/ENB copolymers. Preferred for these systems is polystyrene hydroperoxide. A more in depth discussion of crosslinking agents useful in the present invention is provided hereinbelow.

As should be apparent from the general definition of useful polymeric precursors given hereinabove, the polymeric precursors need not be tri-block copolymers. Indeed, in yet another embodiment, a di-block copolymer is used instead of the tri-block copolymer. As examples, a 1,2-polybutadiene-b-1,4-polybutadiene di-block or a polybutadiene-b-polystyrene di-block, as opposed to the 1,2-PBd-b-1,4-PBd-b-1,2-PBd tri-block of the prior example, can be employed. This embodiment has the advantage of easier phase separations, a reduction of conformational restrictions as compared to a tri-block, and a reduction of instances where the two ends of a tri-block end up in the same hard domain (that is, loop back into the same phase) as opposed to two different domains. In a variation of this embodiment star block copolymers can be used. Star-block copolymers refer to copolymers having three or more functional end blocks.

Selectively crosslinking the thermosettable domain blocks of the polymeric precursor is achieved by using a crosslinking agent. This may include any curative, curing agent, crosslinker, accelerator or catalyst capable of selectively causing the thermosettable domain block of the polymeric precursor to thermoset; that is, irreversibly crosslink into a hard, glassy domain. Exemplary crosslinking agents include peroxides, such as dicumyl peroxide, polystyrene hydroperoxide or 1,2-polybutadiene hydroperoxide. It should be appreciated, however, that crosslinking agents useful for selectively crosslinking a block of a given polymeric precursor will vary depending upon the particular polymeric precursor. Notably, those of ordinary skill in the art will readily be able to choose useful crosslinking agents for a chosen polymeric precursor.

Preferably, the crosslinking agent selectively solubilizes in the glassy domains. This ensures that the crosslinking takes place within the domain that creates the desired thermoset domains. Additionally, solubility of the crosslinking agent within the thermoset domain blocks helps to ensure that substantial crosslinking of the rubbery blocks of the polymeric precursor does not occur.

The crosslinking agent may be directly incorporated into the thermosettable domain blocks of the polymeric precursor such that, upon heating, the crosslinking agent will set. For example, when employing a 1,2-polybutadiene-b-1,4-polybutadiene-b-1,2-polybutadiene polymeric precursor, 1,2-polybutadiene domains are embedded in an elastomeric 1,4-polybutadiene matrix by synthesizing a tri-block that incorporates a crosslinking agent, such as a peroxide, into the 1,2-polybutadiene end blocks. Upon heating, the peroxide decomposes to crosslink and thermosetting of the 1,2-polybutadiene end blocks.

For example, a tri-block copolymer of 1,2-polybutadiene-b-1,4-polybutadiene-b-1,2-polybutadiene having a minor portion of 1,2-polybutadiene end blocks can be employed as the polymeric precursor. This tri-block is synthesized by standard anionic techniques (e.g., sequential polymerization using a difunctional initiator). The 1,2-polybutadiene and 1,4-polybutadiene blocks are thermodynamically incompatible and 1,2-polybutadiene block can be readily made into a hard thermoset by a free radical-chain reaction initiated by peroxide. The 1,4-polybutadiene block will, at most, will only lightly crosslink upon reaction with peroxide.

After crosslinking, the 1,2-polybutadiene domains become hard and glassy while the 1,4-polybutadiene remains uncrosslinked or becomes only lightly crosslinked. The reaction of the peroxide with the 1,2-polybutadiene block is much faster than that with the 1,4-polybutadiene block, and therefore the reaction end products have end blocks that are hard thermosets, while the center blocks remain rubbery. Because the peroxide reacts more readily with the 1,2-polybutadiene blocks, a gradient is believed to form between the 1,2-polybutadiene and 1,4-polybutadiene phases that causes diffusion of peroxide from the 1,4-polybutadiene phase into the 1,2-polybutadiene phase. This causes further crosslinking of the 1,2-polybutadiene blocks relative to the 1,4-polybutadiene phase. The high $T_g$ (about 0° C.) for 1,2-polybutadiene also favors its becoming glassy upon crosslinking. Moreover, extensive crosslinking of the 1,2-polybutadiene phase enhances the degree of phase separation between the 1,2-polybutadiene domains and the 1,4-polybutadiene matrix. The resulting structure consists of thermoset, glassy, high $T_g$ hard domains of 1,2-polybutadiene uniformly embedded in, and covalendy linked to, a soft 1,4-polybutadiene matrix. The cured tri-block exhibits high reinforcement like an analogous SBS, but has reduced set, creep and temperature sensitivity due to the extensively crosslinked end blocks.

In another example 1,4-polyisoprene-b-1,2-polybutadiene-b-1,4-polyisoprene (IBI) is employed as the polymeric precursor. Preferably, curing is made with an accelerated sulfur vulcanization agent. As above, the center and end blocks have different rates of vulcanization, that is, they are thermodynamically separable. In this instance, the polyisoprene cures much more readily than the polybutadiene. With sufficient sulfur levels, it is possible to make a self-reinforced, thermoset rubber in which the bound hard domains are ebonite.

A homopolymer miscible with the matrix blocks of the polymeric precursor may be added to the composition before crosslinking. The miscibility of the homopolymer within the matrix blocks creates a soft phase that contains both stronger covalent bonds and weaker physical-adsorption bonds (interactions) with the hard domains subsequently formed in the end product. The matrix block/miscible homopolymer blend simulates bound carbon black filled rubber by containing bound (matrix block portion) and unbound (homopolymer portion) rubber.

For example, when a 1,2-polybutadiene-b-1,4-polybutadiene-b-1,2-polybutadiene polymeric precursor is employed, a homopolymer miscible with the center block, such as 1,4-polybutadiene monomer, may be added to the tri-block polymeric precursor. The miscibility of the 1,4-polybutadiene with the center (matrix) block of the tri-block creates a soft phase that then contains both stronger covalent and weaker physical-adsorption bonds with the hard domains. The center block/homopolymer blend simulates bound carbon black filled rubber by containing bound (at the 1,4-polybutadiene portion of the tri-block) and unbound (1,4-polybutadiene homopolymer) rubber.

It is also possible to tailor the physical properties of the rubbery composition by doing the opposite of the above procedure, i.e., adding to the polymeric precursor a homopolymer that is miscible in the thermosettable domain block or blocks. This is a useful control in optimizing physical properties of the end rubber. The addition of a homopolymer miscible in the thermoset domain block of the polymeric precursor, such as 1,2-polybutadiene in the above example, reduces the density of covalent linkages between phases. Also, the matrix/thermosettable domain interaction may be modified by adding 1,2-polybutadiene-b-1,4-polybutadiene di-block to the tri-block copolymer. Either of these two additions will have the effect of decreasing the interaction between the rubber matrix and the hard glassy thermoset domains. These additions can be adjusted to specifically control the physical properties of the end product and the domain sizes.

In yet another embodiment, a polysulfide linkage, preferably a short linkage, is introduced between the thermoset and matrix blocks of the polymeric precursor. For example a polysulfide linkage could be introduced between the 1,2-polybutadiene end blocks and the 1,4-polybutadiene center block of the 1,2-polybutadiene-b-1,4-polybutadiene-b-1,2-polybutadiene polymeric precursor, i.e., 1,2-polybutadiene-$S_x$-b-1,4-polybutadiene-$S_x$-b-1,2- polybutadiene, where x is an integer from about 1 to 10 and S is a polysulfide linkage. Here the hard and soft phases would be joined by polysulfide linkages. Thus, the same benefits realized in the bonding of silica particles to rubber with a coupling agent would be provided.

A potential problem with some polymeric precursors may be the insufficient incompatibility of the matrix block or blocks and thermoset domain block or blocks, i.e., a lack of thermodynamic incompatibility. Thus, in yet another embodiment of the present invention, a comonomer is added to promote phase separation between the matrix blocks and the thermosettable domain block or blocks of the polymeric precursor. With 1,2-PBd-b-1,4-PBd-b-1,2-PBd, styrene may be added to promote phase separation between the 1,2-polybutadiene and 1,4-polybutadiene phases. At low levels, the presence of styrene does not interfere with crosslinking of the end blocks (i.e., thermoset domain blocks). In fact, a comonomer compatible with the end blocks will promote crosslinking of the end blocks if it has an affinity for the crosslinking agent (e.g., peroxide). Conversely, a center block comonomer that inhibits crosslinking can be used. Finally, an end block compatible and a center block compatible comonomer can be used together to increase crosslinking and inhibit crosslinking respectively.

Still further, additives can be used to enhance mesophase separation or selectivity of the crosslinking agent. For example, when using a styrene-containing polymeric precursor such as SBS, SIS, SEBS (styrene-b-ethylene butylene diene-b-styrene), SNBS (styrene-b-nitrile-b-styrene), SAS (styrene-b-acrylic-b-styrene), SCS (styrene-b-chloroprene-b-styrene) or SEPS (styrene-b-ethylene propylene diene-b-styrene) tri-block copolymer, divinyl benzene (DVB), or a dimer or oligomer thereof, can be used in conjunction with a peroxide to facilitate extensive crosslinking with only the end blocks. It is believed that the DVB swells the polystyrene upon heating.

In general, a process for producing polymeric compositions according to the present invention proceeds through the following steps. First, the polymeric precursor is synthesized by standard techniques generally known in the art for producing di-block, tri-block, and star-block polymers, having thermodynamically incompatible blocks. The polymeric precursor is then masticated with a properly selected crosslinking agents that will react with the thermosettable domain blocks of the polymeric precursor to form the thermoset domains. The crosslinking agent should either not react with or should only insubstantially react with the matrix blocks of the polymeric precursor such that substantial crosslinking of the matrix blocks does not occur. If other additives, such as, for example, miscible homopolymers or copolymers are used, they are added before or during mastication of the crosslinking agent with the polymeric precursor.

As disclosed hereinabove, the polymeric precursors may be synthesized with polysulfide linages. Additionally, miscible homopolymers or di-block copolymers and/or additives, such as commoners, for promoting phase separation of the polymeric precursor may be added to the polymeric precursors before crosslinking.

EXAMPLE 1

A di-block copolymer having a 1,4-polybutadiene block and a 1,2-polybutadiene block, the specific characteristics of which are shown in Table I, was mixed with various amounts of dicumyl peroxide and cured into sheets of about 1 mm thick by using compression molding techniques for about one hour at 150° C. to mini-dumbbells were cut for each composition and stress-strain responses were determined at 20 cm/min. The results of this analysis is shown in Table II. Also shown in Table II are the analytical results of a commercially obtained polybutadiene polymer (DIENE 35; Firestone Polymers), which is an amorphous single-phase elastomer that contains about 10% 1,2 units, and similar amounts of cis and trans 1,4 units. Those samples employing the di-block copolymer are identified as Sample 1 and those employing the commercially obtained polybutadiene are identified as Sample 2.

The examples should not be viewed as limiting the scope of the invention. The claims will serve to define the invention.

TABLE I

|  | $M_n$ (SEC) kg/mole | $M_w/M_n$ (SEC) | $T_g$ (° C.) (DSC) | % vinyl (NMR) |
|---|---|---|---|---|
| 1,4 block | 101 | 1.09 | −93 | 10 |
| 1,2 block | −24 | — | −11 | 100 |

TABLE II

| Dicumyl peroxide (phr) | 50% modulus (MPa) | | Tensile Strength (MPa) | | Elongation at Break (%) | |
|---|---|---|---|---|---|---|
| Samples | 1 | 2 | 1 | 2 | 1 | 2 |
| 0.02 | 0.48 | — | 1.14 | — | 644 | — |
| 0.05 | 0.68 | 0.43 | 1.50 | 0.74 | 230 | 138 |
| 0.10 | 1.00 | 0.61 | 1.75 | 0.78 | 129 | 75 |
| 0.20 | 1.47 | — | 1.89 | 0.87 | 73 | 46 |

Various modifications and alterations that do not depart from the scope and spirit of this invention will become apparent to those skilled in the art. This invention is not to be duly limited to the illustrative embodiments set forth herein.

What is claimed is:

1. A self-reinforced polymeric composition of matter comprising a plurality of thermoset domains dispersed throughout an elastomeric matrix, wherein said plurality of thermoset domains are formed by thermodynamic phase separation and selective crosslinking of at least one thermosettable domain block of a polymeric precursor and are substantially bonded to the elastomeric matrix.

2. The composition of claim 1, wherein said polymeric precursor is a di-block, tri-block or star-block copolymer.

3. The composition of claim 2, further comprising a polysulfide linkage between the copolymer blocks.

4. The composition of claim 2, further comprising a homopolymer miscible with said at least one thermosettable domain block of said polymeric precursor.

5. The composition of claim 2, further comprising a homopolymer miscible with the elastomeric matrix of said polymeric precursor.

6. The composition of claim 2, wherein said polymeric precursor is a di-block selected from the group consisting of 1,2-polybutadiene-b-1,4-polybutadiene, polybutadiene-b-polystyrene, 1,4-polyisoprene-b-1,2-polybutadiene, ethylidene norbornene-b-polydiene, 1,2-polybutadiene-$S_x$-b-1,4-polybutadiene wherein x is an integer from about 1 to 10 and S is a polysulfide linkage, styrene-b-butadiene, styrene-b-isoprene, styrene-b-ethylene butylene diene, styrene-b-nitrile, styrene-b-acrylic, styrene-b-chloroprene, and styrene-b-ethylene propylene diene.

7. The composition of claim 2, wherein said polymeric precursor is a tri-block selected from the group consisting of 1,2-polybutadiene-b-1,4-polybutadiene-b-1,2-polybutadiene, 1,4-polyisoprene-b-1,2-polybutadiene-b-1,4-polyisoprene, ethylidene norbornene-b-polydiene-b-ethylidene norbornene, styrene-b-polydiene-b-ethylidene norbornene, and 1,2-polybutadiene-$S_x$-b-1,4-polybutadiene-$S_x$-b-1,2-polybutadiene wherein x is an integer from about 1 to 10 and S is a polysulfide linkage.

8. The composition of claim 2, wherein said polymeric precursor is a tri-block selected from the group consisting of styrene-b-butadiene-b-styrene, styrene-b-isoprene-b-styrene, styrene-b-ethylene butylene diene-b-styrene, styrene-b-nitrile-b-styrene, styrene-b-acrylic-b-styrene, styrene-b-chloroprene-b-styrene or styrene-b-ethylene propylene diene-b-styrene.

9. The composition of claim 1, further comprising a comonomer.

10. The composition of claim 9, wherein the comonomer is compatible with said at least one thermosettable domain block of said polymeric precursor.

11. A method for producing a self-reinforced polymeric composition having glassy thermoset domains disposed in an elastomeric matrix comprising the steps of:
  selecting a thermodynamically separable polymeric precursor having at least one thermosettable domain block and at least one matrix block;
  selectively crosslinking the at least one thermosettable domain block of the polymeric precursor with substantially no crosslinking of the at least one matrix block.

12. The method of claim 11, wherein the polymeric precursor is a di-block, tri-block or star-block copolymer.

13. The method of claim 12, wherein the polymeric precursor has a polysulfide linkage between the at least one thermosettable domain block and the at least one matrix block.

14. The method of claim 12, further comprising adding to the polymeric precursor a homopolymer miscible with said at least one thermosettable domain block before said step of selectively crosslinking.

15. The method of claim 12, further comprising adding to the polymeric precursor a homopolymer miscible with the at least one matrix before said step of selectively crosslinking.

16. The method of claim 12, wherein the polymeric precursor is a di-block selected from the group consisting of 1,2-polybutadiene-b-1,4-polybutadiene, polybutadiene-b-polystyrene, 1,4-polyisoprene-b-1,2-polybutadiene, ethylidene norbornene-b-polydiene, 1,2-polybutadiene-$S_x$-b-1,4-polybutadiene wherein x is an integer from about 1 to 10 and S is a polysulfide linkage, styrene-b-butadiene, styrene-b-isoprene, styrene-b-ethylene butylene diene, styrene-b-nitrile, styrene-b-acrylic, styrene-b-chloroprene, and styrene-b-ethylene propylene diene.

17. The method of claim 12, wherein the polymeric precursor is a tri-block selected from the group consisting of 1,2-polybutadiene-b-1,4-polybutadiene-b-1,2-polybutadiene, 1,4-polyisoprene-b-1,2-polybutadiene-b-1,4-polyisoprene, ethylidene norbornene-b-polydiene-b-ethylidene norbornene, styrene-b-polydiene-b-ethylidene norbornene, and 1,2-polybutadiene-$S_x$-b-1,4-polybutadiene-$S_x$-b-1,2-polybutadiene wherein x is an integer from about 1 to 10 and S is a polysulfide linkage.

18. The method of claim 12, wherein the polymeric precursor is a tri-block selected from the group consisting of styrene-b-butadiene-b-styrene, styrene-b-isoprene-b-styrene, styrene-b-ethylene butylene diene-b-styrene, styrene-b-nitrile-b-styrene, styrene-b-acrylic-b-styrene, styrene-b-chloroprene-b-styrene or styrene-b-ethylene propylene diene-b-styrene.

19. The method of claim 11, further comprising the step of adding a comonomer to the polymeric precursor to facilitate thermodynamic phase separation of the at least one thermosettable domain block and the at least one matrix block.

20. The method of claim 19, wherein the comonomer is compatible with the at least one thermosettable domain block of the polymeric precursor.

21. The method according to claim 11, wherein the polymeric precursor also has a crosslinking agent incorporated into the at least one thermosettable domain block.

* * * * *